United States Patent
Scharrer

(10) Patent No.: US 10,276,948 B1
(45) Date of Patent: Apr. 30, 2019

(54) BATTERY CONNECTOR FOR GENERATOR

(71) Applicant: DENSO International America, Inc., Southfield, MI (US)

(72) Inventor: Darin Scharrer, Birch Run, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 16/007,577

(22) Filed: Jun. 13, 2018

(51) Int. Cl.
| | |
|---|---|
| *H01R 4/30* | (2006.01) |
| *H01R 4/70* | (2006.01) |
| *H02K 5/22* | (2006.01) |
| *H01R 4/34* | (2006.01) |
| *H01R 11/12* | (2006.01) |
| *H01R 13/622* | (2006.01) |
| *H01R 13/639* | (2006.01) |

(52) U.S. Cl.
CPC ............... *H01R 4/70* (2013.01); *H01R 4/305* (2013.01); *H01R 4/34* (2013.01); *H01R 11/12* (2013.01); *H02K 5/225* (2013.01); *H01R 4/301* (2013.01); *H01R 13/622* (2013.01); *H01R 13/639* (2013.01)

(58) Field of Classification Search
CPC ..... H01R 4/301; H01R 13/622; H01R 13/639
See application file for complete search history.

(56) References Cited

U.S. PATENT DOCUMENTS

| | | | | |
|---|---|---|---|---|
| 2,829,358 | A * | 4/1958 | Giglio Testori | H01R 13/622 439/321 |
| 5,895,282 | A | 4/1999 | Little | |
| 7,204,709 | B2 * | 4/2007 | Justice | H01R 13/623 439/306 |
| 2005/0181682 | A1 * | 8/2005 | Stepp | H01R 4/305 439/860 |
| 2006/0099839 | A1 * | 5/2006 | Ishida | F16L 41/007 439/157 |
| 2014/0363996 | A1 * | 12/2014 | Mitchell | H01R 13/622 439/339 |

FOREIGN PATENT DOCUMENTS

GB              881971 A       11/1961

* cited by examiner

*Primary Examiner* — Tho D Ta
(74) *Attorney, Agent, or Firm* — Harness, Dickey & Pierce, P.L.C.

(57) ABSTRACT

A connector of a generator for connecting a battery terminal to the generator. The connector includes a fixed base, a rotatable base, and a receiver. The fixed base includes a first locking member. The rotatable base is coupled to the fixed base and is rotatable 360° relative to the fixed base. The rotatable base includes a second locking member that is configured to cooperate with the first locking member to prevent rotation of the rotatable base relative to the fixed base when the first locking member is in cooperation with the second locking member. The receiver is at the rotatable base and is configured to receive the battery terminal and retain the battery terminal at the rotatable base.

18 Claims, 2 Drawing Sheets

BATTERY CONNECTOR FOR GENERATOR

FIELD

The present disclosure relates to a battery connector for a generator.

BACKGROUND

This section provides background information related to the present disclosure, which is not necessarily prior art.

Existing generators include a connector for connecting the generator to a battery. While existing battery connectors are suitable for their intended use, they are subject to improvement. For example, existing battery connectors are limited with respect to the range of wire harness orientations that can be accommodated. The present disclosure advantageously includes improved battery connectors for generators that overcome this limitation in the art, and provide numerous other advantages and unexpected results as explained herein and as one skilled in the art will appreciate.

SUMMARY

This section provides a general summary of the disclosure, and is not a comprehensive disclosure of its full scope or all of its features.

The present disclosure includes a connector of a generator for connecting a battery terminal to the generator. The connector includes a fixed base, a rotatable base, and a receiver. The fixed base includes a first locking member. The rotatable base is coupled to the fixed base and is rotatable 360° relative to the fixed base. The rotatable base includes a second locking member that is configured to cooperate with the first locking member to prevent rotation of the rotatable base relative to the fixed base when the first locking member is in cooperation with the second locking member. The receiver is at the rotatable base and is configured to receive the battery terminal and retain the battery terminal at the rotatable base.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
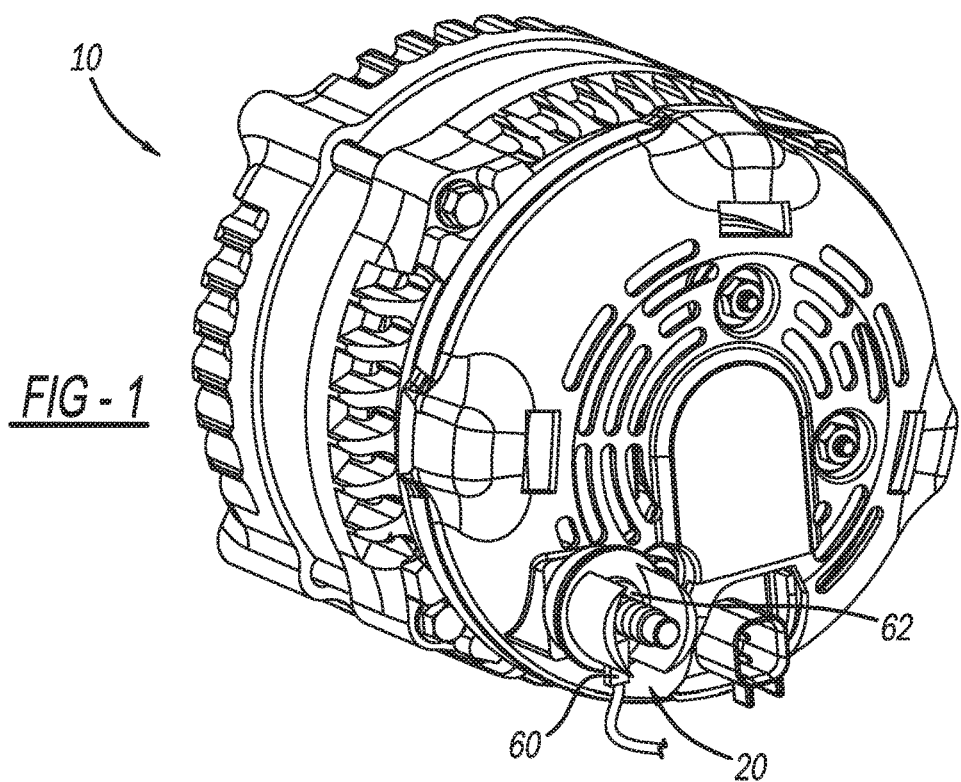
FIG. 1 is a perspective view of an exemplary generator including a battery connector in accordance with the present disclosure.

FIG. 1 illustrates an exemplary generator 10 including a connector 20 in accordance with the present disclosure for connecting a battery terminal 60 to the generator 10. The generator 10 may be any suitable generator, such as an alternator, including a vehicle alternator. The battery terminal 60 can be any suitable battery terminal, such as a battery positive (+) terminal.

Figure 2:
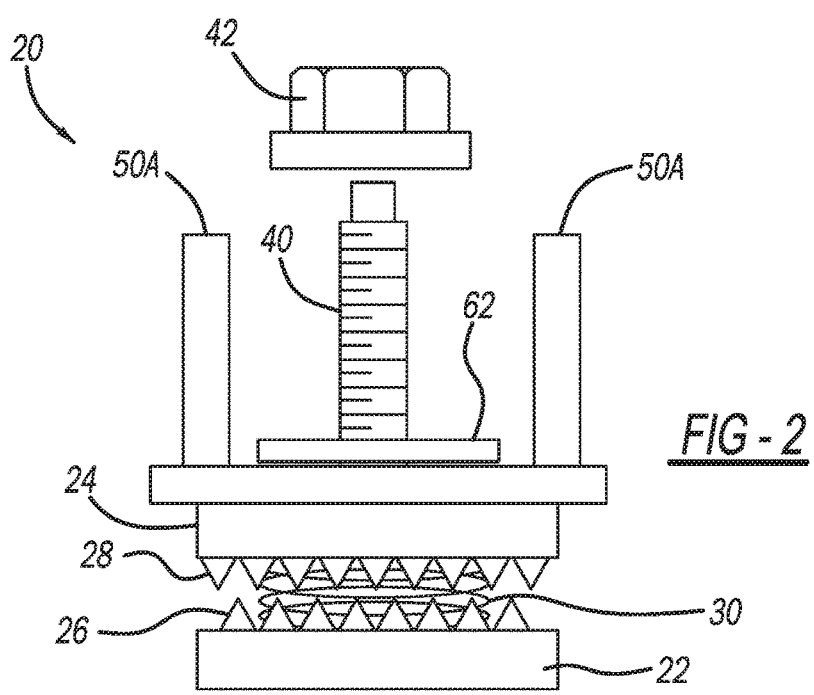
FIG. 2 is a side view of the battery connector of FIG. 1.
Figure 3:
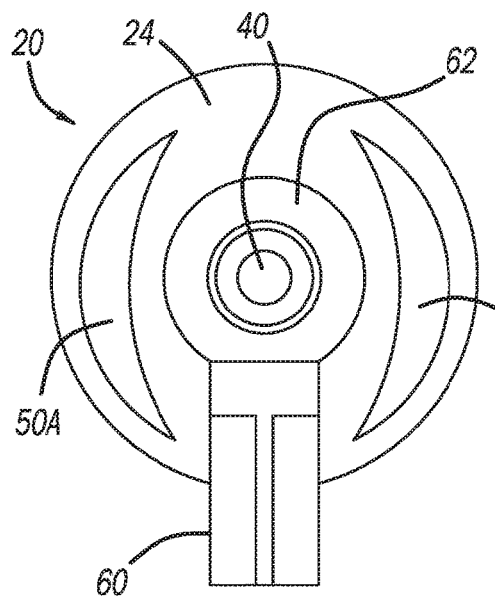
FIG. 3 is a top view of the battery connector of FIG. 1.

With reference to FIGS. 2 and 3, the connector 20 includes a fixed base 22 and a rotatable base 24. The rotatable base 24 is rotatable 360° relative to the fixed base 22 to facilitate coupling with the battery terminal 60 at any suitable orientation. The fixed base 22 and the rotatable base 24 can be made of any suitable material, such as any suitable polymeric material.

The fixed base 22 includes first locking members 26, and the rotatable base 24 includes second locking members 28. The first and second locking members 26 and 28 cooperate to "lock" the rotatable base 24 relative to the fixed base 22 at a desired orientation. The first and second locking members 26 and 28 can be any suitable locking members configured to prevent rotation of the rotatable base 24 relative to the fixed base 22 when the first and second locking members 26 and 28 are in cooperation with one another. In the example illustrated, the first locking members 26 are first teeth, and the second locking members 28 are second teeth that are sized, shaped, and positioned to cooperate with the first teeth of the first locking members 26.

The fixed base 22 and the rotatable base 24 are connected by a spring 30. The spring 30 is biased to retain or pull the rotatable base 24 towards the fixed base 22, and thus the spring 30 is biased to retain the second locking members 28 in cooperation with the first locking members 26. To rotate the rotatable base 24 relative to the fixed base 22, the rotatable base 24 is pulled outward and away from the fixed base 22, thereby flexing (or expanding) the spring 30 and disengaging the second locking members 28 from cooperation with the first locking members 26. With the first and second locking members 26 and 28 disengaged, the rotatable base 24 can be rotated up to 360° to any suitable orientation relative to the fixed base 22. The spring 30 is thus configured to accommodate rotation of the rotatable base 24 relative to the fixed base 22.

Extending from the rotatable base 24 is a receiver 40 for the battery terminal 60. The receiver 40 can be any suitable battery terminal receiver, such as a threaded bolt. To connect the battery terminal 60 to the receiver 40, an eyelet terminal 62 of the battery terminal 60 is seated on the receiver 40, and a nut 42 is threaded onto the receiver 40 and down onto the eyelet terminal 62.

Extending from the rotatable base 24 are terminal anti-rotation features 50A. In the example illustrated, the terminal anti-rotation features 50A are two flanges on opposite sides of the receiver 40. The terminal anti-rotation features 50A and 50B rotate with the rotatable base 24. When the rotatable base 24 is locked in position relative to the fixed base 22 as explained above, the terminal anti-rotation features 50A restrict rotation of the battery terminal 60 about the receiver 40.

Figure 4:
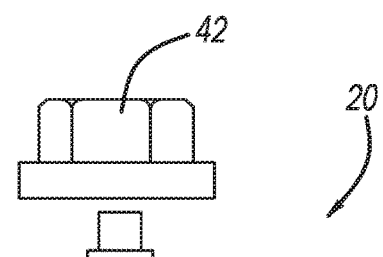
FIG. 4 is a side view of another battery connector in accordance with the present disclosure.
Figure 5:
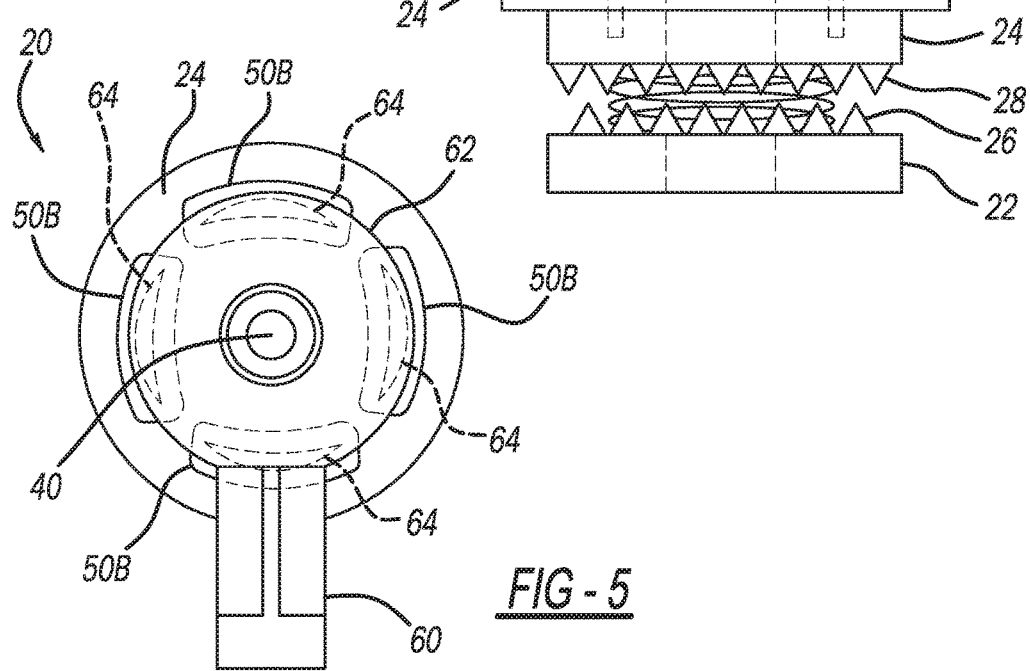
FIG. 5 is a top view of the battery connector of FIG. 4.

With reference to FIGS. 4 and 5, the present disclosure includes alternate terminal anti-rotation features 50B, which are slots or receptacles defined in the rotatable base 24. The slots 50B are sized, shaped, and arranged to receive terminal flanges 64 of the battery terminal 60. Cooperation between the terminal flanges 64 and the slots 50B restricts rotation of the battery terminal 60 relative to the rotatable base 24.

The present disclosure thus advantageously provides for a connector 20 of a generator 10 for connecting a battery terminal 60 to the generator 10 at any suitable orientation as a result of the ability of the rotatable base 24 to be rotated 360° relative to the fixed base 22. The connector 20 thus advantageously is able to accommodate a wider range of wire harness routings for the battery terminal 60 as compared to previous connectors. The connector 20 is thus a universal connector, which eliminates any need for manufacturing or storing in inventory a plurality of different connectors each limited with respect to the wire harness orientations that can be accommodated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A connector of a generator for connecting a battery terminal to the generator, the connector comprising:
   a fixed base including first locking members;
   a rotatable base coupled to the fixed base and rotatable 360° relative to the fixed base, the rotatable base including second locking members configured to cooperate with the first locking members to prevent rotation of the rotatable base relative to the fixed base when the first locking members are in cooperation with the second locking members; and
   a receiver at the rotatable base configured to receive the battery terminal and retain the battery terminal at the rotatable base;
   wherein the receiver is a bolt.

2. The connector of claim 1, wherein the rotatable base is coupled to the fixed base with a spring that is arranged to bias the rotatable base against the fixed base and the second locking members into cooperation with the first locking members.

3. The connector of claim 1, wherein the first locking members are first teeth and the second locking members are second teeth configured to cooperate with the first teeth.

4. The connector of claim 1, wherein the bolt receiver is a threaded bolt configured to cooperate with a nut, the nut is threaded on the bolt to retain the battery terminal on the bolt and on the rotatable base.

5. The connector of claim 1, wherein the fixed base and the rotatable base are both made of a polymeric material.

6. The connector of claim 1, wherein the battery terminal is a battery positive terminal.

7. The connector of claim 1, wherein the rotatable base further includes a terminal anti-rotation feature that restricts rotation of the battery terminal relative to the rotatable base when the battery terminal is coupled to the receiver.

8. The connector of claim 7, wherein the terminal anti-rotation feature includes a first post and a second post both extending from the rotatable base on opposite sides of the receiver.

9. The connector of claim 7, wherein the battery terminal includes an eyelet terminal.

10. A connector of a generator for connecting a battery terminal to the generator, the connector comprising:
- a fixed base including first locking teeth;
- a rotatable base including second locking teeth configured to mesh with the first locking teeth, the rotatable base is connected to the fixed base with a spring that biases the second locking teeth into cooperation with the first locking teeth to restrict rotation of the rotatable base relative to the fixed base; and
- a receiver at the rotatable base configured to receive the battery terminal and retain the battery terminal at the rotatable base;
- wherein the rotatable base is rotatable 360° relative to the fixed base upon pulling of the rotatable base apart from the fixed base to expand the spring and separate the second locking teeth from the first locking teeth; and
- wherein the receiver is a bolt.

11. The connector of claim 10, wherein the bolt is a threaded bolt configured to cooperate with a nut, the nut is threaded on the bolt to retain the battery terminal on the bolt and on the rotatable base.

12. The connector of claim 10, wherein the battery terminal includes an eyelet terminal.

13. The connector of claim 10, wherein the fixed base and the rotatable base are made of polymeric material.

14. The connector of claim 10, wherein the battery terminal is a battery+terminal.

15. The connector of claim 10, wherein the rotatable base further includes a terminal anti-rotation feature that restricts rotation of the battery terminal relative to the rotatable base when the battery terminal is coupled to the receiver.

16. The connector of claim 15, wherein the terminal anti-rotation feature includes a first post and a second post both extending from the rotatable base on opposite sides of the receiver.

17. A connector of a generator for connecting a battery terminal to the generator, the connector comprising:
- a fixed base including first locking members;
- a rotatable base coupled to the fixed base and rotatable 360° relative to the fixed base, the rotatable base including second locking members configured to cooperate with the first locking members to prevent rotation of the rotatable base relative to the fixed base when the first locking members are in cooperation with the second locking members; and
- a receiver at the rotatable base configured to receive the battery terminal and retain the battery terminal at the rotatable base;
- wherein the rotatable base further includes a terminal anti-rotation feature that restricts rotation of the battery terminal relative to the rotatable base when the battery terminal is coupled to the receiver; and
- wherein the terminal anti-rotation feature includes at least one slot defined by the rotatable base that is sized and shaped to receive the battery terminal therein.

18. A connector of a generator for connecting a battery terminal to the generator, the connector comprising:
- a fixed base including first locking teeth;
- a rotatable base including second locking teeth configured to mesh with the first locking teeth, the rotatable base is connected to the fixed base with a spring that biases the second locking teeth into cooperation with the first locking teeth to restrict rotation of the rotatable base relative to the fixed base; and
- a receiver at the rotatable base configured to receive the battery terminal and retain the battery terminal at the rotatable base;
- wherein the rotatable base is rotatable 360° relative to the fixed base upon pulling of the rotatable base apart from the fixed base to expand the spring and separate the second locking teeth from the first locking teeth;
- wherein the rotatable base further includes a terminal anti-rotation feature that restricts rotation of the battery terminal relative to the rotatable base when the battery terminal is coupled to the receiver; and
- wherein the terminal anti-rotation feature includes at least one slot defined by the rotatable base that is sized and shaped to receive the battery terminal therein.

\* \* \* \* \*